(No Model.) 3 Sheets—Sheet 1.

J. TRETHEWEY.
COMBINED HARVESTER AND THRASHER.

No. 380,000. Patented Mar. 27, 1888.

Witnesses:
Joseph E. Ford
E. Patten

Inventor:
James Trethewey
by Smith & Osborn,
His Attys.

(No Model.) 3 Sheets—Sheet 2.
J. TRETHEWEY.
COMBINED HARVESTER AND THRASHER.

No. 380,000. Patented Mar. 27, 1888.

(No Model.) 3 Sheets—Sheet 3.
J. TRETHEWEY.
COMBINED HARVESTER AND THRASHER.
No. 380,000. Patented Mar. 27, 1888.
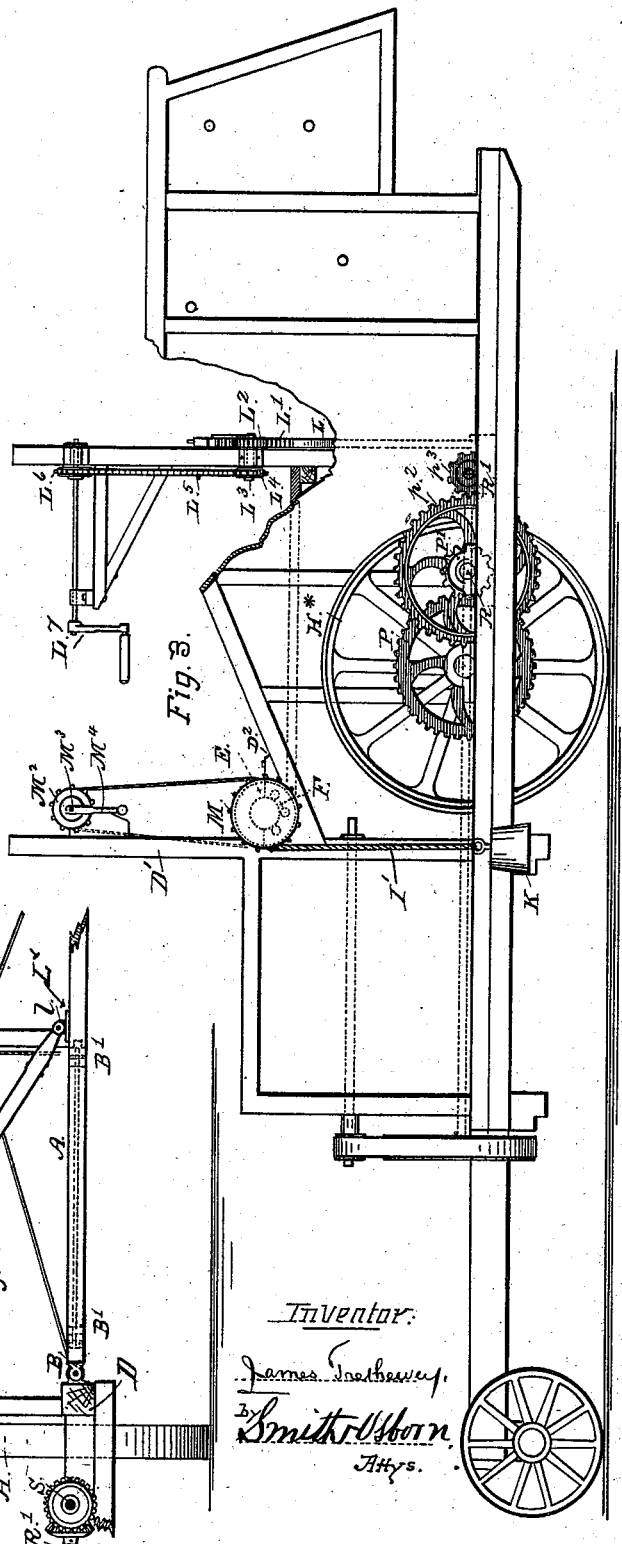
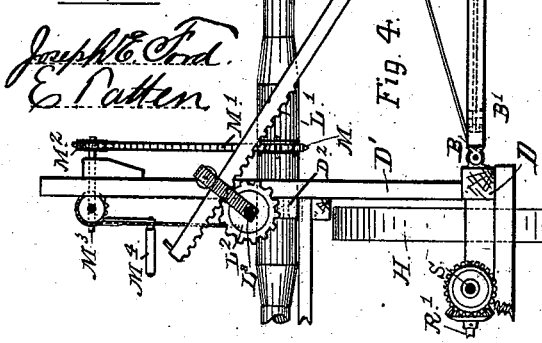

UNITED STATES PATENT OFFICE.

JAMES TRETHEWEY, OF STOCKTON, CALIFORNIA.

COMBINED HARVESTER AND THRASHER.

SPECIFICATION forming part of Letters Patent No. 380,000, dated March 27, 1888.

Application filed April 7, 1887. Serial No. 234,083. (No model.)

*To all whom it may concern:*

Be it known that I, JAMES TRETHEWEY, a citizen of the United States, residing at Stockton, in the county of San Joaquin and State of California, have invented certain new and useful Improvements in Combined Harvesters and Thrashers; and I do hereby declare that the following is a full, clear, and exact description of my said invention, reference being had to the drawings that accompany and form part of this specification.

My invention relates to improvements in harvesting-machines of that class which thrash and separate the grain as it is cut; and the several improvements contained and embodied in my combined harvesting and thrashing machine, and which distinguish it from other machines of the kind heretofore produced, consist in a novel construction and combination of parts, hereinafter set forth, and pointed out in the claims.

The following description fully explains the nature of these several improvements and the manner in which I construct, combine, and carry out the same in the production of an improved machine of the character mentioned.

The parts shown in the accompanying drawings are referred to by figures and letters.

The several figures contained in three sheets of drawings represent only the general structure of the frame-work and the construction and relative positions of my improvements, as those parts of the machine relating particularly to the cutting, thrashing, and separating and the means for conveying and handling the grain from the harvester to the thrasher form no part or feature of my present invention, and a specific or detailed description and illustration thereof is not believed to be necessary to a clear understanding of the invention.

Figure 1:
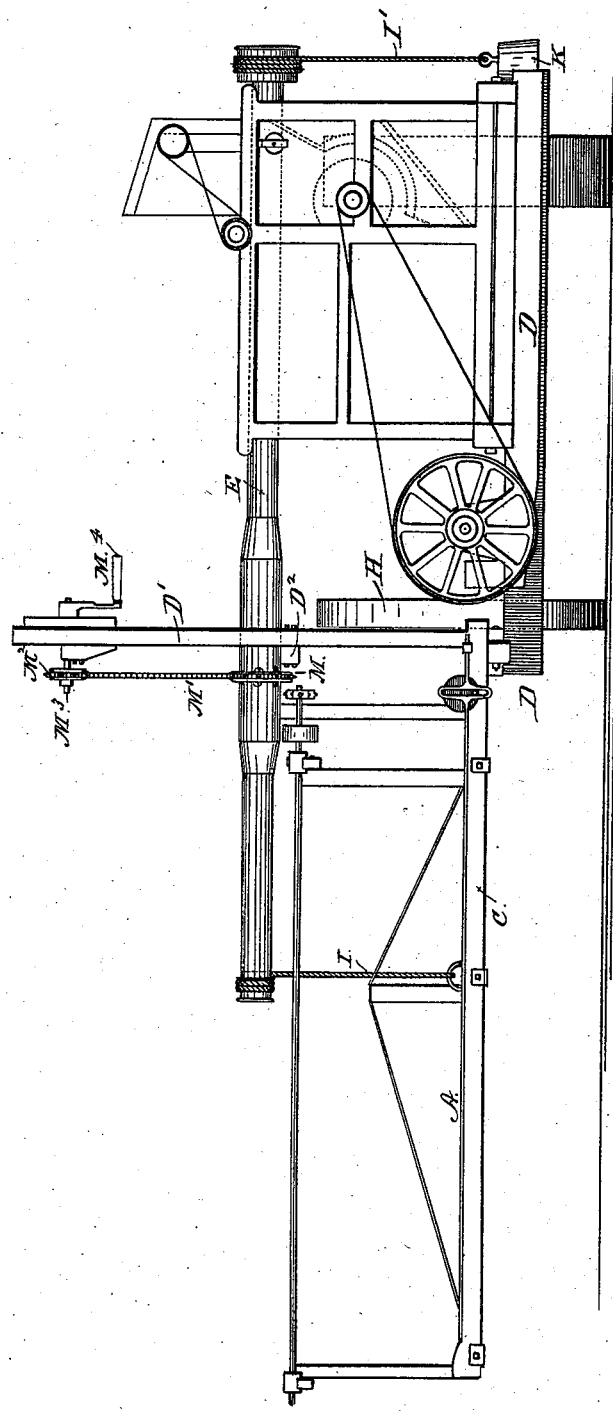
Figure 2:
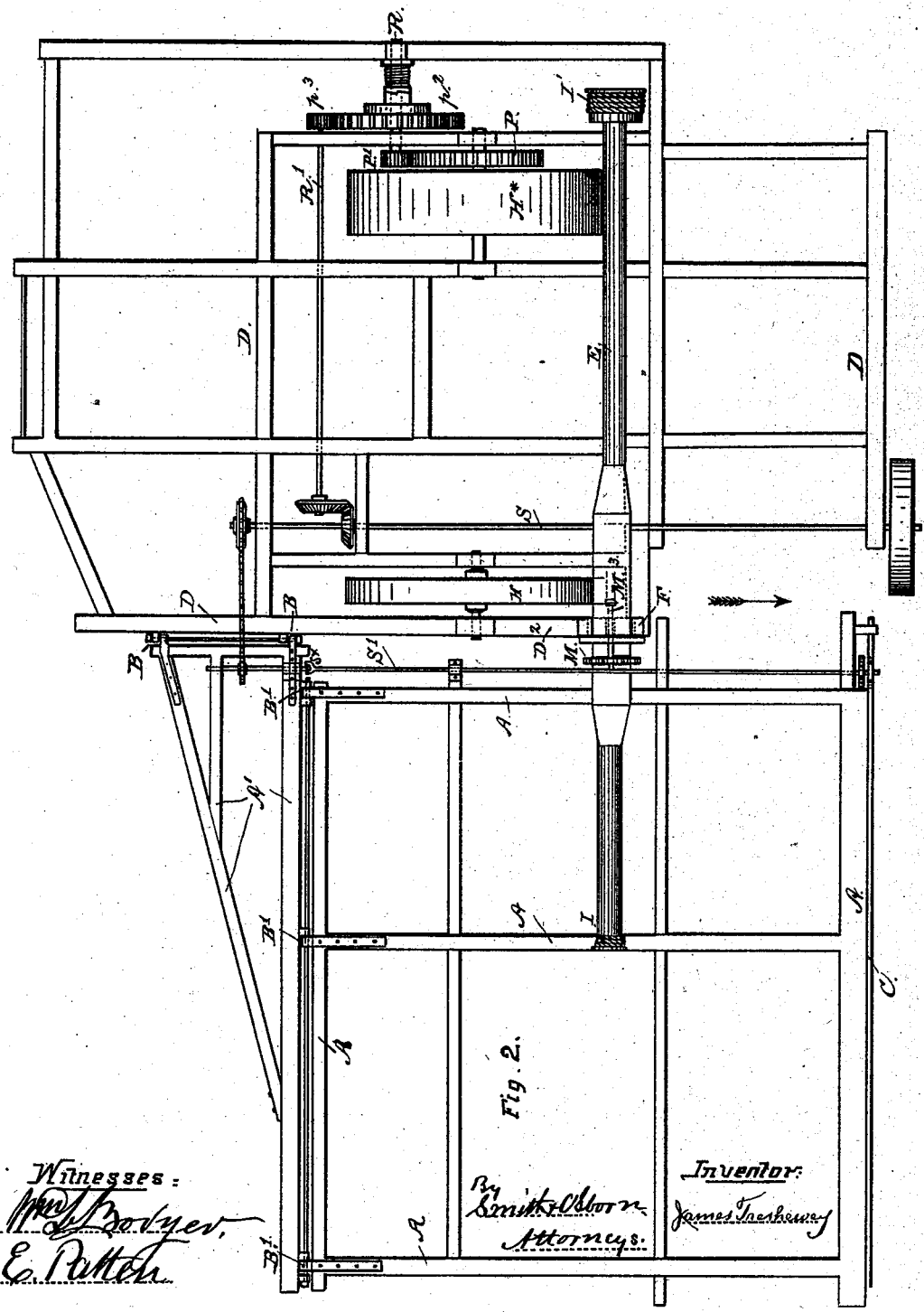

In the accompanying drawings, Figure 1 is a front elevation of the machine, the sickle-bar, reel, and conveying-aprons or "drapers," as well as other parts on the thrasher proper, being omitted. Fig. 2 is a plan or top view of the frame-work of the harvester and the truck or frame that carries the thrashing apparatus. Fig. 3 is an elevation of the stubble side of the machine. Fig. 4 shows the mechanism employed to regulate and set the harvester-frame, taken from the right hand of Fig. 3.

One part or feature of my invention consists in suspending and carrying the harvester-frame at the side of the thrasher truck or frame from a rotary drum resting across and supported by the truck or thrasher frame, and having a counter-weight at one end to balance the weight of the frame and parts mounted on it that are suspended from the other end.

The harvester-frame is composed of two parts or frames—to wit, a main frame, A, which will bear the harvesting mechanism, and a supplemental supporting-frame, A', which is hinged to the thrasher frame or truck D, and to the front side of frame A' the frame A is hinged.

C is the sickle-bar on the front of the harvester-frame, and immediately over it are mounted the reel and other parts that make the complete machine. These parts are omitted from the drawings, however, as their construction or arrangement forms no particular feature in the present invention.

To raise and lower the harvester-frame on the joint B as a center, I employ the mechanism shown in Fig. 4 of the drawings, in which L is an inclined bar, attached at its lower end, by a jointed connection, $l$, to the rearmost cross-bar, $L^\times$, of the frame and furnished with a rack, L', at the upper end portion to engage with a spur-wheel, $L^2$, on a short shaft, $L^3$, above.

By means of a sprocket-wheel, $L^4$, on the short shaft $L^3$ and the endless chain $L^5$, the spur-wheel is connected with the shaft of a sprocket-wheel, $L^6$, having the crank $L^7$ for turning it. Rotation of the spur-wheel $L^2$ will therefore raise or lower the outer end of the harvester-frame A, according to the direction in which the crank L' is turned, and by placing a ratchet-wheel and pawl on the crank-shaft, after the usual manner of locking a shaft that is required to be held from turning backward, the frame is held at any given point of elevation. The platform-frame A is hinged to the front edge of the supplemental frame A' by hinges B' along a transverse line, to regulate the height of the cutting apparatus above the ground, and upon this joint as a center the front edge of the platform-frame can be raised and lowered.

From the joint B of the supplemental frame to the thrasher-frame an adjustment is obtained to change the inclination of the harvester-frame in a transverse direction, as called for by irregularities in the surface of the ground—such as are due to elevations and depressions or in working on an incline—while from the hinges B' between the harvester and the supplemental frame the height of the sickle-bar at the front is adjusted or raised from time to time to clear obstructions or to follow the changes in the surface over which it is passing.

E is the rotary drum or cylinder, resting in an open bearing, F, on the upper longitudinal timber, D², of the thrasher truck or frame, just above the inside wheel, H, of the truck, and from this point the drum extends at one side over the harvester-frame behind the reel and at the other side over the thrashing-chamber or just back of it to the outside of the thrasher-truck D. The harvester-frame A is suspended by the rope I from one end of this drum, and it is balanced by the weight K on the opposite end of the drum.

Both the harvester-frame and the counter-weight are connected to this drum by ropes I I', that are laid in several coils around the ends of the drum for the purpose of using the rotation of the drum as a means for raising and lowering the front end of the harvester-frame upon the transverse hinges B', connecting it with the supplemental frame, and to this end the drum is made of cylindrical form at the portion that rests in the bearing as well as at the ends where the ropes are laid, and a device is provided for turning it in its bearing to wind or unwind the ropes. This device is shown in Figs. 1, 3, and 4. It is composed of the sprocketed ring M, fixed on and encircling the drum, and the endless chain M', connecting it with a sprocket-wheel, M², on the short shaft M³, having a crank, M⁴, for turning it. Shaft M³ is mounted on a bracket secured near the upper end of upright frame-piece D'. By turning the crank, rotation of the drum E on its bearing F takes place, and the front end of the harvester-frame A is raised or lowered upon the hinge between it and the supplemental frame, according to the direction of motion, by the winding up or unwinding of the rope I. The coils of this rope are wound upon one end of the drum in the reverse direction to those of the rope carrying the weight at the other end, and the weight is so proportioned to the weight of the harvester-frame that the frame will remain balanced by the weight and be supported at any point at which it is set, and the drum cannot turn, excepting as it is moved by the crank M⁴.

The manner in which I obtain and apply the power to actuate the sickle-bar and to drive the thrashing apparatus is clearly shown in Fig. 2 and the side view in Fig. 3. The outside wheel, H*, is the traction and driving wheel, having a driving-gear, P, on its axle to engage the pinion P' on the short shaft R. This shaft is geared to the counter-shaft R' by the spur-gears $p^2 p^3$, and the shaft R', running across the thrasher truck or frame D to the inner side, connects the shaft R' with a long shaft, S, running fore and aft, and from which power is taken by belts and pulleys at the front end to drive the thrashing and separating apparatus on the truck and by a sprocket-pulley and chain at the opposite end to work the harvesting apparatus. The power at this end is applied to the shaft S', mounted on the harvester-frame, that actuates the sickle-bar, and as the connection of one shaft to the other is placed back of the line of joint B', a joint, as shown at S×, in the shaft S' is required, which would not be necessary if provision were made in the construction to place the connection in front of the line of joint—as, for instance, at some point between the joint B' and the drum E. In this manner I secure an equal distribution of the work to the ends of the driving-shaft and on opposite sides of the point of application of the driving-power, and in consequence of such arrangement I overcome irregular action of the driven parts, secure smoothness of motion, and prevent strain in the boxes and bearings. There is also considerable advantage in applying the power between the driving mechanism of the harvester and the mechanism of the thrasher on the one driving-shaft.

Having thus fully described my invention, what I claim, and desire to secure by Letters Patent, is—

1. The combination, with the thrasher-truck and the harvester-frame hinged to the side thereof on the line of draft, of the rack-bar L, pivoted at one end to the rear side of the harvester-frame and extended in an inclined position up to a standard on the truck, and a gear or pinion, L², secured upon the truck and engaging the rack-bar, and means, substantially as described, for operating the gear or pinion, as set forth.

2. The combination of the thrasher-truck, the supporting-frame A', hinged to the side thereof on the line of draft, and the main harvester-frame A, hinged at its rear side to the front side of the supporting-frame, the rotary drum mounted on the thrasher-truck, and having a chain or rope wound upon one end connecting it with the main harvester-frame, and a chain or rope and weight wound upon the other end to counterbalance the harvester-frame.

3. In a combined harvesting and thrashing machine, the combination, with the thrasher-truck, of a harvester-frame attached by a hinge-joint in the line of draft to the side of the thrasher-truck, and means for supporting it clear of the ground, consisting of a revolving drum mounted in bearings on the thrasher-truck and extending over the harvester-frame, and supporting the front section thereof by a rope or flexible connection, substantially as set forth.

4. The combination of the thrashing truck or frame, the harvester-frame attached to its side by a hinge-joint in the line of draft, and the supporting rotary drum mounted in bearings on the thrasher-frame, a rope connecting one end of the drum with the front section of the harvester-frame, and a counter-weight and rope at the opposite end to balance the weight of the said harvester-frame, substantially as set forth.

5. In a combined harvester and thrasher, the combination of the thrasher-truck with the harvester-frame, the latter composed of two sections, of which one is hinged to the side of the thrasher-frame and the other is hinged to the front side of the first named, and a means for raising and lowering the front section, consisting of a transverse rotary drum mounted in bearings on the thrasher-frame, so as to rotate thereon, and having the front section of the harvester-frame suspended by a rope wound upon one end of said drum and a counter-weight attached to the end of a rope wound upon the other end of the drum, and mechanism for turning the drum in its bearings to wind or unwind the ropes, substantially as set forth.

In testimony that I claim the foregoing I have hereunto set my hand and seal.

JAMES TRETHEWEY. [L. S.]

Witnesses:
R. E. WILHOIT,
GEO. E. WILHOIT.